J. S. WINTERMUTE.
COMBINATION RACK AND CAR.
APPLICATION FILED MAY 1, 1908.

918,109.

Patented Apr. 13, 1909.
3 SHEETS—SHEET 3.

Witnesses
J. S. Edmunds
A. L. Miller

Inventor
John S. Wintermute
By P. J. Edmunds
Attorney

UNITED STATES PATENT OFFICE.

JOHN S. WINTERMUTE, OF ST. THOMAS, ONTARIO, CANADA.

COMBINATION RACK AND CAR.

No. 918,109.         Specification of Letters Patent.         Patented April 13, 1909.

Application filed May 1, 1908. Serial No. 430,398.

*To all whom it may concern:*

Be it known that I, JOHN S. WINTERMUTE, a subject of the King of Great Britain, and a resident of St. Thomas, in the county of Elgin, in the Province of Ontario, Canada, have invented a new and useful Combination Rack and Car, of which the following is a specification.

This invention relates to the conveying of hay, or other similar class of product, from the rear end to the front end of a hay rack. In ordinary practice this is heavy and laborious work performed by a man, who, standing on the load, throws the hay, by means of a pitchfork, from the rear end to the front end of the hay-rack.

The object of this invention is to readily, easily and instantly fill the front end of the hay rack, to dispense with the services of the man on the load, who is usually employed for this purpose, and to provide a simple, strong, durable, inexpensive and efficient device for this purpose. And this invention consists of a car, in combination with and so placed at the rear end of a hay rack, that the hay from any hay loader will be delivered thereon, which car after being loaded is adapted to be readily, easily and instantly moved to the front end of the hay rack, and it also consists of the improved construction and novel combination of parts of the same as will be hereinafter first fully set forth and described and then pointed out in the claims.

Figure 1:
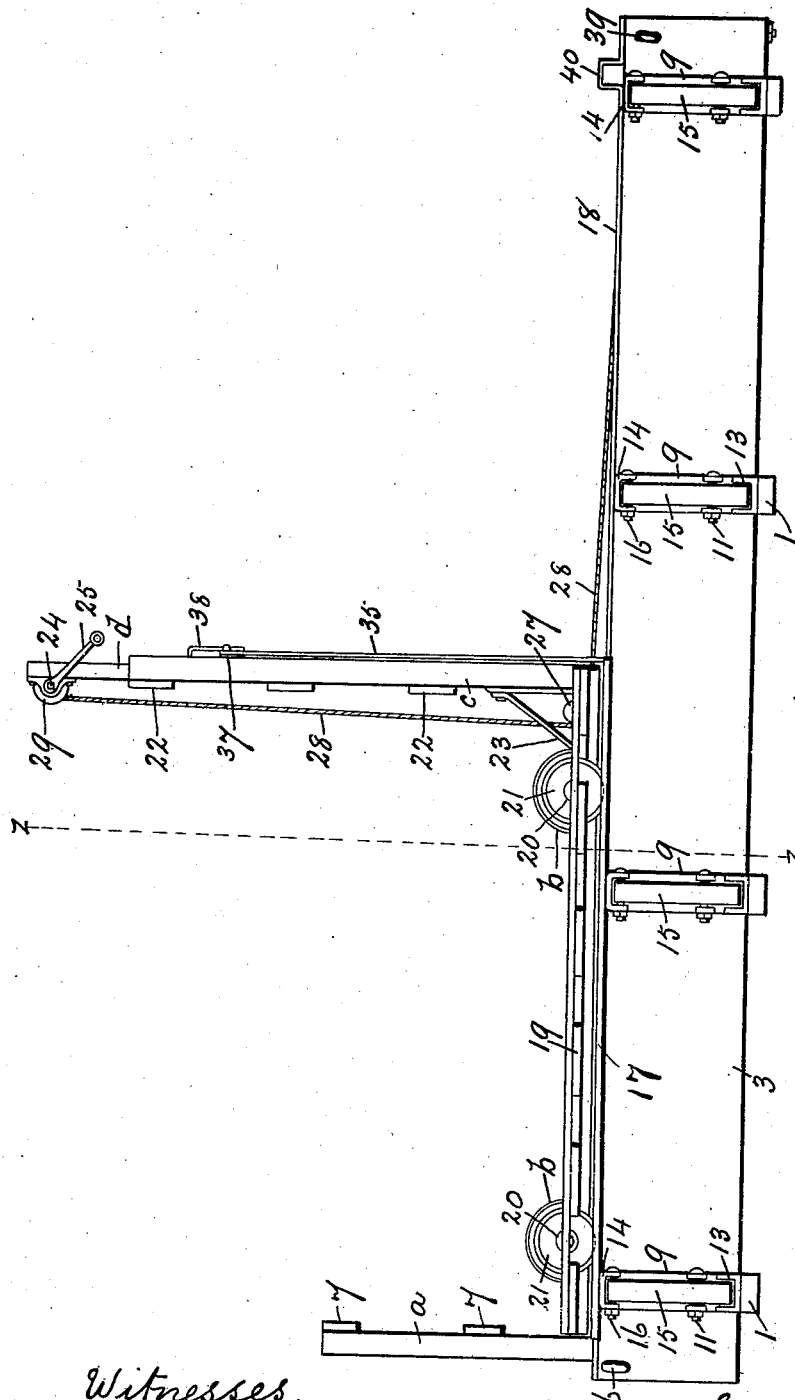
Figure 2:
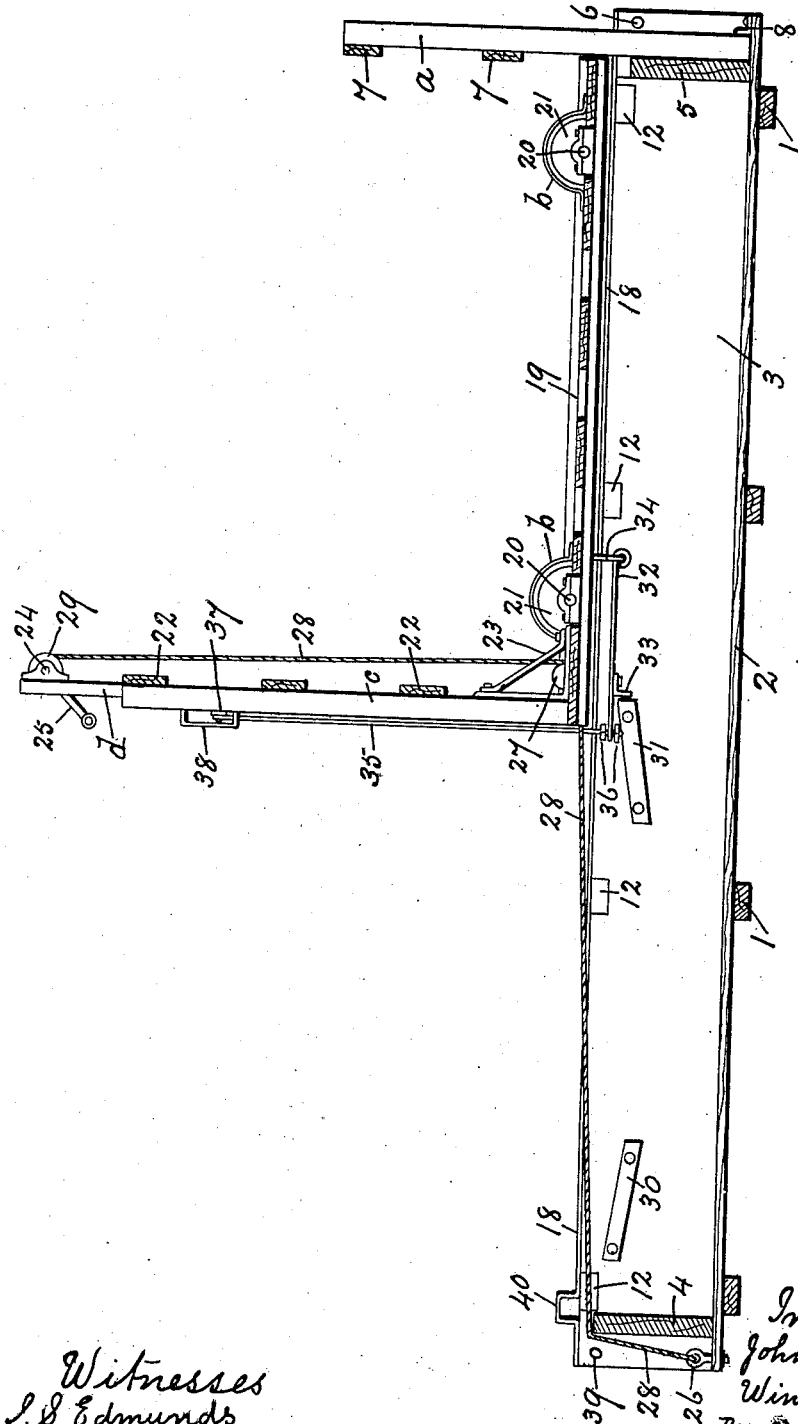
Figure 3:
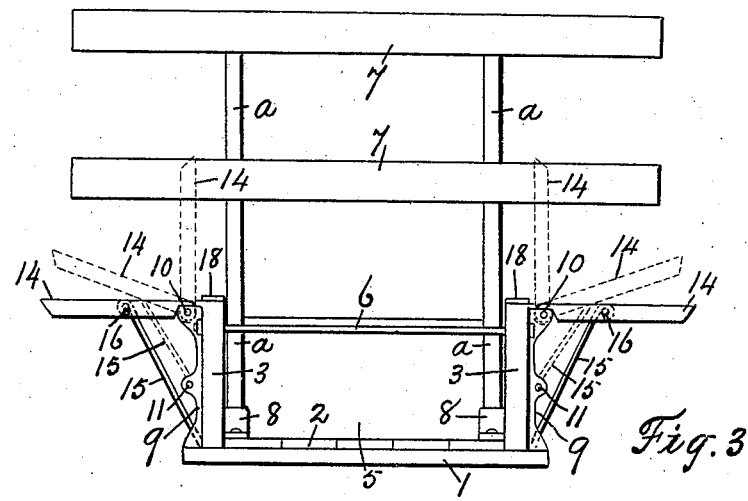
Figure 4:
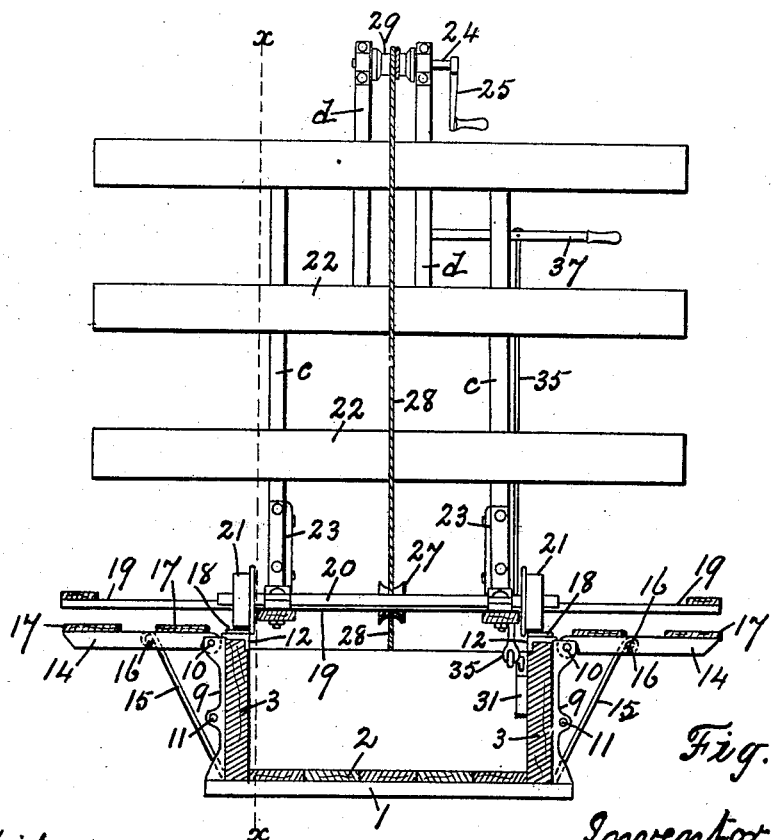

Reference is had to the accompanying drawings forming part of this specification, wherein:

Figure 1 is a side view of a combined hay rack and car embodying my invention. Fig. 2 is a longitudinal sectional view of same on the line $x, x$, of Fig. 4, and looking at it from the opposite side to that shown in Fig. 1. Fig. 3 is a rear end view of Fig. 1. Fig. 4 is a cross sectional view on the line $z, z$, of Fig. 1.

In the accompanying drawings; the numeral 1 indicates the sills, 2 the floor, 3 the sides, 4 the front end, 5 the tail board and 6 the tail rod of a hay rack box.

7 indicates the rear or back end of the hay rack in the form of a short ladder, which is held in place and in an upright position by being interposed between the opposite sides 3, the tail board 5 and the tail rod 6; and the lower ends of the uprights, $a$, of said rear end 7 of said hay rack are inserted in sockets 8 secured to the floor 2 to further assist in supporting and retaining said back end 7 of said hay rack in place and in an upright position.

9 indicates irons on the outer faces of the sides 3 and at opposite sides of the rack box. 10 and 11 indicate bolts supported by, 12 a hook formed on the upper end of, and 13 a recess formed in each of, said irons 9.

14 indicates angle steel shelving arms one of which is pivotally secured to each of the irons 9 by a pivot bolt 10, and 15 angle steel braces the upper end of each of which is pivotally secured to one of the shelving arms 14 by a pivot bolt 16, as shown in Figs. 3 and 4, and the lower ends of said braces 15 are adapted to engage with the bolts 11 or with the recesses 13 in said irons 9, as desired. The lower ends of said irons 9 are bolted or otherwise rigidly secured to the portions of the sills 1, extending beyond the sides 3, and the upper hooked end 12 of each of said irons 9 are hooked over the upper edges of the sides 3, as shown in Fig. 4; to firmly and rigidly secure said irons 9 to said sides 3 of said rack box.

17 indicates the shelving sides of the hay rack, which are secured to the shelving arms 14 at opposite sides of the rack box, and said shelving sides 17 extend lengthwise of and over about one-half of the rack box, as shown in Figs. 1 and 2, or they may extend throughout the whole length of the rack box if desired.

18 indicates track rails which are formed of thin strips of steel or other suitable material secured to the upper edges of the sides 3, as shown in the accompanying drawings, but said rails 18 may be located at any place or position on the inside of the sides 3 or on the first board of the shelving sides 17 of the hay rack, which may be a short distance out from the sides 3, as preferred.

19 indicates a car, 20 are axles supported in suitable bearings on said car, and 21 wheels mounted on said axles 20, and adapted to revolve and travel on the track rails 18; and said car 19 extends across the hay rack box, as shown in Fig. 4.

$b$, indicates covers which extend over the wheels 21 to prevent the hay interfering with their operation.

22 indicates the front end or ladder of the hay rack the uprights, $c$, of which are braced and rigidly secured to the front end of the car 19 by the braces 23.

24 indicates a shaft mounted in bearings secured to a supplemental frame, d, and the latter is secured to the front end 22 of said hay rack.

25 indicates a crank secured to one end of said shaft 24.

26 indicates a loop or eye secured to the floor 2 at the front end of the rack box, and 27 a pulley mounted to revolve perfectly free on the car 19.

28 indicates a rope one end of which is secured to the spool 29 and the latter is secured to the shaft 24, this rope 28 then extends under the pulley 27 and to the front end of the rack box where it is secured to the loop or eye 26.

30 and 31 indicate inclined locking stops rigidly secured to the interior face of one of the sides 3 of the rack box, the locking stop 30 being inclined upward toward the front end and the locking stop 31 inclined upward toward the rear end of the rack box.

32 indicates a locking latch provided with a shoulder 33, and one end of said locking latch 32, is pivotally secured to a loop or eye 34 secured to the car 19, and the other end of said locking latch 32 is secured to one end of a vertical connecting rod 35 by the nuts 36.

37 indicates a hand lever pivotally secured at one end to the supplemental frame, d, and to this lever midway between its ends the other end of the connecting rod 35 is secured.

38 indicates a guide secured to one of the uprights, c, of the front end 22 of the hay rack to hold said lever against said front end 22 of said hay rack, and to guide said lever vertically when it is operated.

39 indicates a rod which connects the front ends of the sides together.

40 are stops on the front ends of the track rails 18 to prevent the car 19 running off the rails at the front end of the rack box.

The operation is as follows: The car 19 is first adjusted on the track rails 18 to the position shown in Fig. 1, that is to the rear end of the hay rack; and when adjusting said car to this position the shoulder 33 of the locking latch 32 rides up on the inclined locking stop 30, until said shoulder 33 falls down at the upper end of said locking stop 30, when said car 19 is securely held in position against accidental movement at the rear end of the hay rack. While said car 19 is being securely held in this position as described, hay from the hay loader falls on said car 19, between the rear end 7 and the front end 22 of the hay rack, until all the hay is delivered on the car that it can hold.

When it is desired to move the car 19 to the front end of the hay rack, the lever 37 is raised to lift the shoulder 33 above and clear of the locking stop 30, when so adjusted, by turning the crank 25 to wind rope 28 on the spool 29, the car 19 is moved to the front end of the hay rack, and without interfering in any way with or stopping the operation of the hay loader; the hay on this car is thus readily, easily and instantly conveyed to the front end of the hay rack. And while said car 19 is being adjusted to the front end of the hay rack the shoulder 33 on the locking latch 32 rides up on the inclined locking stop 31, until said shoulder 33 falls down at the end of said inclined locking stop 31, which firmly holds said car 19 in place against accidental movement and leaves the rear end of the hay rack clear to be filled with hay.

After the hay rack has been filled, the hay delivered and unloaded, the rack returned to the field and the hay loader attached, by raising the lever 37 the shoulder 33 is raised clear of the locking stop 31, when the car 19 may be again moved in position at the rear end of the hay rack and the operation before described repeated and so on until all the hay or other product, is gathered.

As shown in the drawings, the irons 9, the shelving arms 14 and braces 15, which support the shelving sides 17 of the hay rack, are all located outside of the hay rack box leaving the top and the inside of the rack box clear in order to attach the track rails at any place or position on top or inside of the rack box. And the shelving arms 14 to which the shelving sides 17 of the rack are secured being pivotally mounted on the pivot bolts 10, the braces 15 may be adjusted to engage with the bolts 11, as shown by dotted line in Fig. 3, to incline the shelving arms 14 and shelving sides 17 to the position shown by inclined dotted lines 14, in Fig. 3, to clear the wheels of some wagons, and at the same time form a hay rack with inclined shelving sides. Or these shelving sides 17 and arms 14 may extend the whole length of the rack box, and be adjusted to the position shown by the vertical dotted lines 14, shown in Fig. 3, and the opposite arms connected together by cross rods to hold them in this upright position, when by securing a short ladder in place at the front end of the rack box, a rack adapted for stock may be formed; of course when so used, the car 19 and attachments are removed. Again by removing the car and attachments and securing a short ladder similar to the ladder 7 at the front end of the rack box, the rack may be adapted to hold and carry sheaves of grain.

Having thus described my invention, I claim:

1. In a device of the class described, a rack box, and inclined locking stops secured to the inner face of one of the sides of said rack box, in combination with a car adapted to move back and forth on said rack box, a locking latch pivoted on said car, a locking shoulder secured to said locking latch and adapted to engage with said inclined locking stops, a connecting rod secured to said locking latch, and a lever pivoted on said car, to which one end of said connecting rod is secured, and adapted to release said locking shoulder from said locking stops.

2. In a device of the type described, a rack box embodying sides, a rear rack carried by said rack box, tracks mounted on the upper edges of said sides, a car mounted to travel on said tracks, a ladder carried by said car at one end thereof, a supplemental frame carried by said ladder, a shaft journaled in said frame and provided with a spool, a cable connected at one end to said spool and at its other end to the front end of the rack box, inclined locking stops secured to the inner face of one of said sides, a locking latch carried by the car and provided with a shoulder adapted to engage with said inclined locking stops, a rod carried by said car and extending upwardly beside the said ladder and connected at its lower end to said locking latch, and a lever connected to the upper end of said rod for actuating the same to release the locking latch from engagement with the inclined locking stops.

3. In a device of the type described, a rack box embodying sides, tracks carried by said sides, irons secured to said sides, shelving arms pivotally connected to said irons, shelving sides secured to said shelving arms, means for securing said shelving arms and shelving sides in different positions, a car mounted to travel on said tracks, a ladder carried by said car at one end thereof, a supplemental frame carried by said ladder, a shaft carried by said frame and provided with a spool, a pulley carried by the car adjacent the lower end of said ladder, a cable connected at one end to the spool and passing around said pulley with its other end connected to the front end of the rack box, a locking latch carried by said car underneath the same, inclined locking stops secured to the inner face of one of said rack box sides, a shoulder on the locking latch to engage with said locking stops, and means carried by the car for disengaging said shoulder from the locking stops, substantially as described.

In testimony whereof, I have signed in the presence of the two undersigned witnesses.

JOHN S. WINTERMUTE.

Witnesses:
P. J. EDMUNDS,
A. L. MILLER.